(12) United States Patent
Thies et al.

(10) Patent No.: US 11,110,417 B2
(45) Date of Patent: Sep. 7, 2021

(54) DEVICE AND METHOD FOR GRANULATING A POWDER OR A POWDER MIXTURE

(71) Applicant: Glatt Maschinen—und Apparatebau AG, Pratteln (CH)

(72) Inventors: Jochen Thies, Loerrach (DE); Reinhard Nowak, Loerrach (DE)

(73) Assignee: Glatt Maschinen—und Apparatebau AG, Pratteln (CH)

( * ) Notice: Subject to any disclaimer, the term of this patent is extended or adjusted under 35 U.S.C. 154(b) by 400 days.

(21) Appl. No.: 15/971,058

(22) Filed: May 4, 2018

(65) Prior Publication Data

US 2018/0326380 A1 Nov. 15, 2018

(30) Foreign Application Priority Data

May 9, 2017 (DE) ...................... 10 2017 109 948.4

(51) Int. Cl.
| | |
|---|---|
| *B01F 15/00* | (2006.01) |
| *B01F 3/12* | (2006.01) |
| *B01J 2/10* | (2006.01) |
| *B01F 7/00* | (2006.01) |

(52) U.S. Cl.
CPC ...... *B01F 15/00233* (2013.01); *B01F 3/1214* (2013.01); *B01F 3/1221* (2013.01); *B01J 2/10* (2013.01); *B01F 7/00741* (2013.01)

(58) Field of Classification Search
CPC .............. B01F 15/00233; B01F 3/1221; B01F 3/1214; B01F 7/00741; B01J 2/10
USPC ................................................ 366/151, 151.1
See application file for complete search history.

(56) References Cited

U.S. PATENT DOCUMENTS

| | | | | |
|---|---|---|---|---|
| 5,497,232 | A | * | 3/1996 | Watano ...................... B01J 2/00 356/23 |
| 5,581,477 | A | | 12/1996 | Hanaoka |
| 6,042,033 | A | * | 3/2000 | Sugimoto ............... B01F 7/162 241/101.2 |
| 2008/0116056 | A1 | | 5/2008 | Folestad et al. |

(Continued)

FOREIGN PATENT DOCUMENTS

| | | | |
|---|---|---|---|
| CN | 201275471 Y | * | 7/2009 |
| IN | 201621017605 A | * | 11/2017 |

(Continued)

OTHER PUBLICATIONS

Machine translation for CN201275471 (Y)—Mar. 24, 2020 (Year: 2009).*

*Primary Examiner* — Huy Tram Nguyen
(74) *Attorney, Agent, or Firm* — The Webb Law Firm

(57) ABSTRACT

Described is a device for granulating a powder to be granulated or a powder mixture to be granulated. The device includes at least one working vessel in which the powder to be granulated or the powder mixture to be granulated is provided, at least one mixer for mixing the powder to be granulated or the powder mixture to be granulated, at least one dosing device for granulating liquid, and at least one drive unit that includes a rotational speed range for providing a drive torque required for the mixer. The drive unit provides a uniformly high drive torque over its entire rotational speed range. Also described is a method for granulating a powder to be granulated or a powder mixture to be granulated using such a device.

11 Claims, 3 Drawing Sheets

(56) References Cited

U.S. PATENT DOCUMENTS

2009/0308960 A1* 12/2009 Brickl .................... B02C 17/16
            241/98
2010/0318228 A1* 12/2010 Clancy ..................... B01J 2/10
            700/281
2012/0057018 A1    3/2012 Arp

FOREIGN PATENT DOCUMENTS

WO      9106365 A1    5/1991
WO   2008017634 A1    2/2008

* cited by examiner

DEVICE AND METHOD FOR GRANULATING A POWDER OR A POWDER MIXTURE

CROSS-REFERENCE TO RELATED APPLICATION

This application claims priority to German Patent Application No. 10 2017 109 948.4 filed May 9, 2017, the disclosure of which is hereby incorporated in its entirety by reference.

BACKGROUND OF THE INVENTION

The invention is based on a device and a method for granulating a powder or a powder mixture.

Devices and methods for granulating powders or powder mixtures have been prior art for a long time. These devices comprise a mixer arranged in a working vessel to granulate the powder mixtures which is driven by a drive unit as well as a dosing option for granulating liquid.

The international patent application WO 1991/006365 A1, for example, shows such a device for mixing and/or granulating. The device in this case has two granulating units, each granulating unit comprising a chamber whose wall has a cylindrical shell with a horizontal axis and an end wall at both shell ends. A rotor rotatable around its axis is arranged in each chamber, said rotor being designed to be able to convey the product present in the chamber concerned forwards and backwards depending on its rotational direction. Each rotor is rotated by a motor alternating in different rotational directions when mixing and/or granulating a product. Each chamber is provided at one end with an outlet, the rotor being rotated to empty the chamber such that it conveys the granulate formed in the chamber to the outlet. The device has a good mixing effect, enables quick emptying of the chamber and is well suited to automatic operation. What is disadvantageous with this technical solution is that the granulate properties of the formed product cannot be influenced and set during the ongoing process in the above-described device and in the associated method.

The international patent application WO 2008/017634 A1 also discloses a device for granulating and/or mixing, in particular a pharmaceutical active ingredient formulation, the device comprising a cylindrical granulating pot closable with a lid, to which, at the base side, a rotating mixer head is assigned and to which, on the circumference, a rotatable chopper is assigned, an insert reducing the receiving volume being fastened to the lid. The mixer head is driven via a drive shaft coupled to the direct or alternating current motor via a transfer gear. In spite of the very complex structure, all essential characteristic values of the granulation process can be precisely detected:

- Number of revolutions of the mixer and chopper motor via the set voltage rating in the case of direct current motors and/or via contactless tachometers
- Temperature of the granulate product by way of temperature sensors inserted from above or at the side
- Toughness of the granulating mass by measuring the torque on the drive shaft of the mixer motor or via the power consumption of the mixer motor.

The measurement data simplify the upscaling of the granulating process. However, what is disadvantageous with this technical solution is that the granulate properties of the formed product are not influenced and directly settable during the ongoing process.

SUMMARY OF THE INVENTION

The object thus underlying the invention is to influence and directly set the granulate properties during the ongoing granulation process.

The object is thus achieved by a device and a method for granulating a powder mixture with the features described herein.

The device according to the invention for granulating a powder to be granulated or a powder mixture to be granulated comprising at least one working vessel in which the powder to be granulated or the powder mixture to be granulated is provided, at least one mixer to mix the powder to be granulated or the powder mixture to be granulated, at least one dosing device or dosing option for granulating liquid for example a nozzle or the like, at least one drive unit comprising a rotational speed range for providing a drive torque required for the mixer having the characterising features described herein, in contrast, has the advantage that the granulate properties, for example the granulate particle size or the like of the formed product can be influenced and directly set during the ongoing process. It has been surprisingly shown that the provision of a uniformly high drive torque by the drive unit over its entire rotational speed range allows the shear forces, which are proportional to the mixer rotational speed, to be changed or varied in the granulation process such that the direct setting of the granulate properties, for example the granulate particle size or the like is possible. The torque is understood as the physical variable that is respectively designated which for example produces a torsion or bending of the drive shaft. It is the product of force [N] and lever arm [m], provided the force and the lever arm are perpendicular to one another. The torque has a unit of energy:

1 nm (newton-metre) corresponds to 1 j (Joule) or 1 ws (watt second).

The torque of the drive shaft which drives the mixer is proportional to the power output of the direct or alternating current motor coupled to the drive shaft.

$$P = 2 \cdot \pi \cdot M \cdot n$$

M: torque [nm]
n: rotational speed [1/s]
P: output [w]
π: Pi (3.1415926)

An additional advantage of a uniformly high drive torque provided by the drive unit is that the mixer can at all times mix the granulating mass which is very tough and viscous owing to the dosing of granulating liquid if necessary. The starting-up of the mixer after an idle phase of the granulating mass can be hereby ensured at all times even though the granulating mass may be very tough and viscous due to the dosing of the granulating liquid. The idle phase(s) during the granulation process are useful in many granulation processes and their products since the granulating liquid generally requires some time to optimally integrate with the powder mixture provided. In this case, diffusion and swelling processes play an important role and the required quantities of granulating liquids can also be reduced by the idle phase(s). Pellets, in particular round and uniformly large agglomerates can also be produced in the device according to the invention for example the above-described high shear granulating. A torque-stable mode of operation may also be advantageous for the shaping of the round agglomerates. As soon as the pellets are formed, an irregular growing process can be stopped or at least notably slowed down for example by drastically reducing the mixer rotational speed.

According to one advantageous configuration of the device according to the invention, the drive unit is a hydraulic, servo and/or torque motor. All these drive units have the advantageous feature of the torque produced being controllable independently of the rotational speed, i.e. the torque being uniform over the entire rotational speed range.

According to an additional advantageous configuration of the device according to the invention, the device has a chopper. The chopper chops up clumps or pieces that have become excessively large due to agglomeration processes and thus guarantees a precise setting of the granulate particle size.

According to an additional advantageous configuration of the device according to the invention, the device is a high shear granulator.

According to an additional advantageous configuration of the device according to the invention, the device is a particle size measuring system. The advantage of a particle size measuring system is that it can ensure the monitoring of the granulate particle size for example by camera systems or the like, i.e. technical systems which can detect the granulate particle size. The particle size measuring system increases the product quality and makes the granulation process independent of human monitoring, if necessary.

According to an additional advantageous configuration of the device according to the invention, the device has additional measuring systems which for example detect and can thus subsequently directly influence additional properties of the granulate particles during the granulation process. In this case, sensors for detecting the temperature and/or the moisture in the granulate and/or the air are used. The granulate quality is further increased by the additional measuring systems.

The method according to the invention for granulating a powder to be granulated or a powder mixture to be granulated comprising at least one working vessel in which the powder to be granulated or the powder mixture to be granulated is provided at least one mixer to mix the powder to be granulated or the powder mixture to be granulated, at least one dosing device or dosing option for granulating liquid for example a nozzle or the like, at least one drive unit comprising a rotational speed range for providing a drive torque required for the mixer, the powder to be granulated provided in the at least one working vessel or the powder mixture to be granulated provided in the at least one working vessel firstly being mixed by the mixer and granulating liquid being added at the same time at least periodically, having the characterising features described herein, in contrast, has the advantage that the granulate properties, for example the granulate particle size or the like of the formed product can be influenced and directly set during the ongoing process. It has been surprisingly shown that the provision of a uniformly high drive torque by the drive unit over its entire rotational speed range allows the shear forces, which are proportional to the mixer rotational speed, to be changed or varied such that the direct setting of the granulate properties, for example the granulate particle size or the like is possible. That is to say, even with low rotational speeds and thus small shear forces, the high torques required for granulation, owing to a tough and viscous granulating mass, can thus be applied. An additional advantage of a uniformly high drive torque provided by the drive unit is that the mixer can at all times mix the granulating mass which is very tough and viscous owing to the dosing of granulating liquid if necessary.

According to one advantageous configuration of the method according to the invention, a particle size measuring system monitors the granulate particle size during the granulation process. This monitoring of the granulate particle size can for example be implemented by camera systems or the like, i.e. technical systems, which can detect the granulate particle size. After the size of the granulate particles has been detected, the data is then processed assisted by a computer such that the factors influencing the granulate particle size such as for example the shear forces are optimally set. This has the advantage that, on the one hand, the operator can intervene in the granulation process at any time during the granulation process and thus the desired granulate particle size can be set. On the other hand, it has the advantage that the product quality is again notably increased by the use of the particle size measuring system.

According to an additional advantageous configuration of the method according to the invention, the particle size measuring system controls and/or regulates the drive unit. After the current granulate particle size has been detected, the determined data is compared with the target data assisted by a computer and the torque is set via the drive unit such that the granulate particle achieves the desired size. Time-consuming sample taking can advantageously at least be reduced by regulation process.

According to an additional advantageous configuration of the method according to the invention, the particle size measuring system controls and/or regulates the dosing of the granulating liquid as a function of the granulate particle size. After the actual granulate particle size has been detected, the determined data is compared with the target data assisted by a computer and, if necessary, additional granulating liquid is added to the granulating mass such that the granulate particle size achieves the desired size. Time-consuming sample taking can advantageously also at least be reduced by such a regulation process.

According to an additional advantageous configuration of the method according to the invention, the particles produced by the method are pellets.

Further advantages and advantageous configuration of the invention can be inferred from the following description, the claims and the drawings.

BRIEF DESCRIPTION OF THE DRAWINGS

Preferred exemplary embodiments of the subject matter according to the invention are represented in the drawing and are explained in detail below. They show FIG. 1 a schematic sketch of a typical high shear granulator, FIG. 2 a diagram to illustrate the performance of a drive unit plotted over the granulating liquid or the time for an exemplary granulation process, FIG. 3 a typical torque course for constant rotational speed and dosing of water, FIG. 4 a diagram to illustrate dependence of the rotational speed on the dosing of liquid, both being plotted for an exemplary granulation process over time and FIG. 5 a diagram to illustrate the nominal torque plotted over the rotational speed of different drive units.

DESCRIPTION OF THE INVENTION

Figure 1:
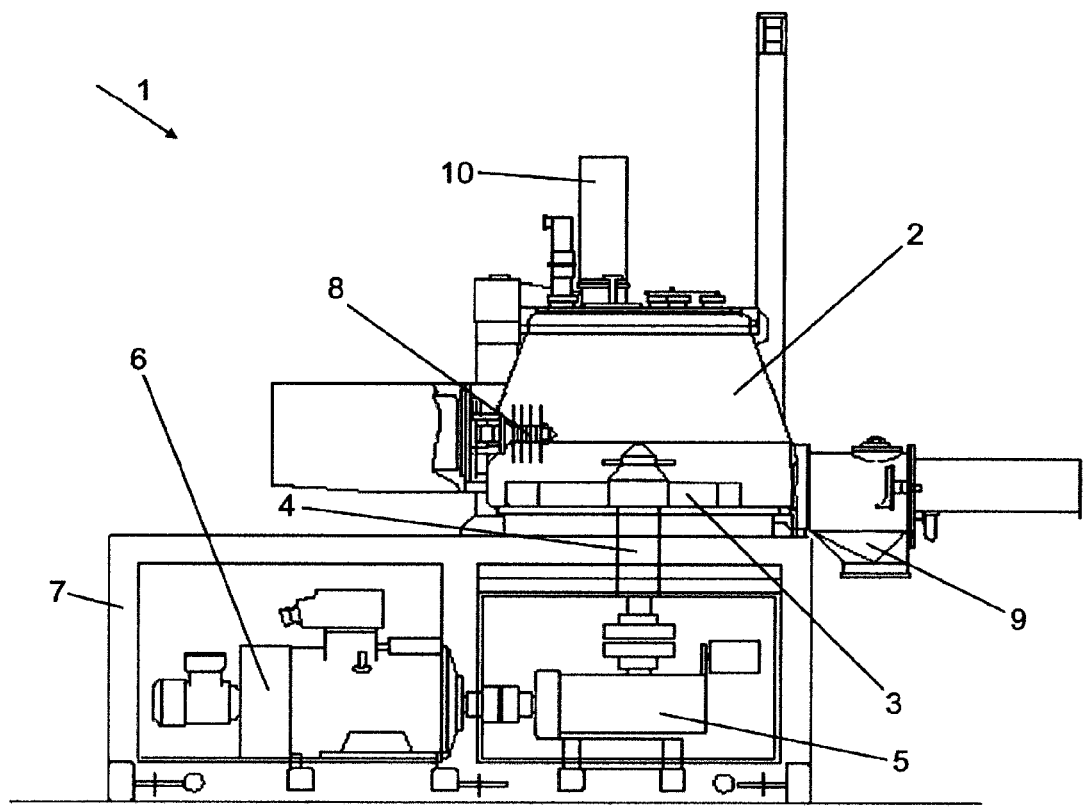

FIG. 1 shows a typical device 1 for granulating, in particular a high shear granulator. Said high shear granulator comprises a vertically-upright working vessel 2 in which a powder to be granulated or a powder mixture to be granulated is provided. To this end, the powders required for the granulate to be produced are introduced into the working vessel 2. The powder mixture provided is mixed by a mixer 3 which for example has a plurality of mixer vanes. The mixer 3 is driven by means of a drive shaft 4 which is coupled to a drive unit 6 via a gear 5, the drive unit 6 being arranged in a machine frame 7. A granulating liquid, e.g. water or the like is then added to the powder mixture provided in the working vessel 2 by suitable pumps and nozzles, not shown here. A drive torque of the mixer 3 required for granulating increases due to the dosing of the granulating liquid to the powder mixture provided in the working vessel 2 since the granulating mass is, if necessary, very tough and viscous due to the dosing of the granulating liquid. In general, a chopper 8 is switched on during the granulation process in order to break any large clumps or pieces. After the granulation process, the granulate is emptied from the working vessel 2 via the drain 9. Any developing exhaust air is discharged from the working vessel 2 via a filter 10.

Figure 2:
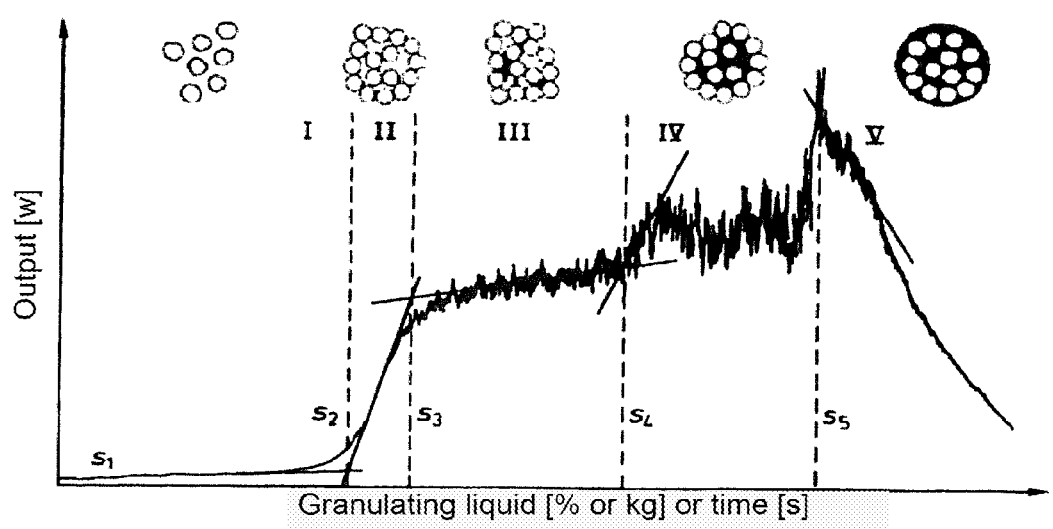

The output in watts is represented over the introduced granulating liquid in percent or kilograms or over time in seconds in a diagram in FIG. 2, the rotational speed being kept constant during the granulation process. In the case of mixed granulation, the process is controlled by measuring the electric output of the drive unit 6. This (electric) output of the drive unit 6 is thus directly proportional to the torque and the output curve represented also corresponds to the torque curve. Based on the output or torque curve of the drive unit 6 shown in the diagram, the toughness of the granulating mass and thus also the end point of the granulation can thus be determined. FIG. 2 divides the granulation process shown by way of example into the five phases described below:

In the first phase (I), the powder or powder mixture made of the required powders is produced and moistened. A slight increase or no increase in the output of the drive unit 6 can be determined here. The output level remains virtually constant in the first phase (I).

The second phase (II) shows the beginning agglomeration of the particles of the powder or the powder mixture with the dosing of granulating liquid, the finest liquid and/or solid bonds being formed during the agglomeration between the particles of the powder mixture. The granulating mass is thus tough and viscous. The output of the direct or alternating current motor coupled to the drive shaft thus increases sharply due to the formation of these very fine liquid and/or solid bonds between the particles of the powder mixture. The required torque thus also strongly increases.

In the third phase (III), the development of liquid and solid bridge bonds can be discerned when the optimal moistness of the powder or the powder mixture is reached which leads to an output or torque plateau. The curve shown notably levels off in the third phase (III) in comparison to the second phase (II).

In the fourth phase (IV), the curve in turn increase sharply since the powder or the powder mixture is too moist owing to the further dosing of granulating liquid. All cavities between the granulating particles are now filled with liquid. The agglomerate is completely wetted.

In the fifth phase (V), the excessively moist mixture becomes a suspension and a two-phase system is formed. The required output or the required torque reduces rapidly.

Figure 3:
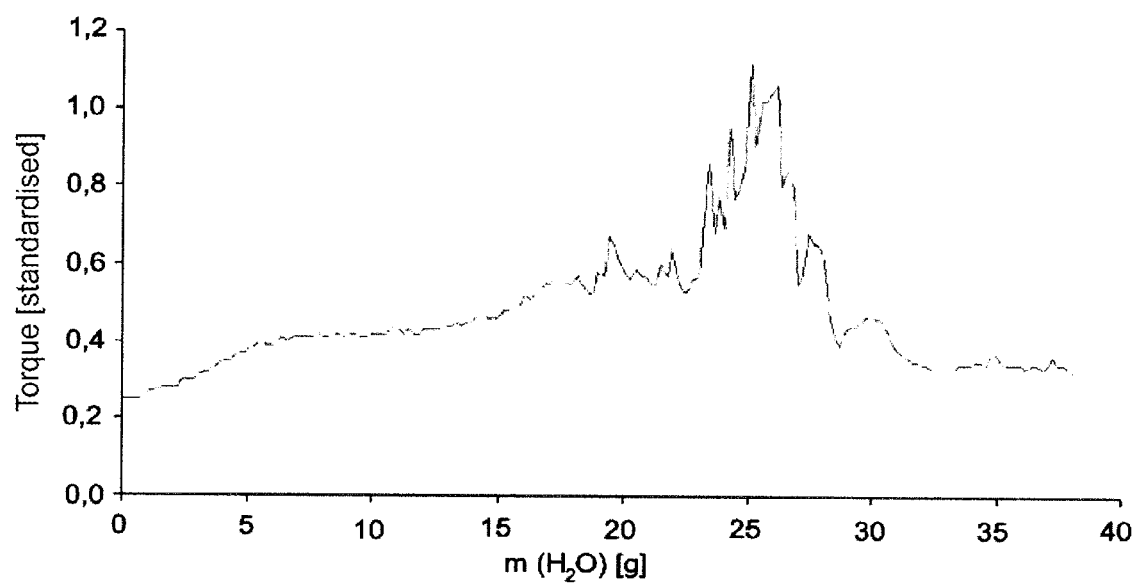

FIG. 3 also shows a typical torque curve at constant rotational speed and constant dosing of water. In the example shown, roughly five times as much torque is required at the peak than at the start of the dosing of liquid. In the case of many granulation processes, this behaviour is even notably more pronounced.

Figure 4:
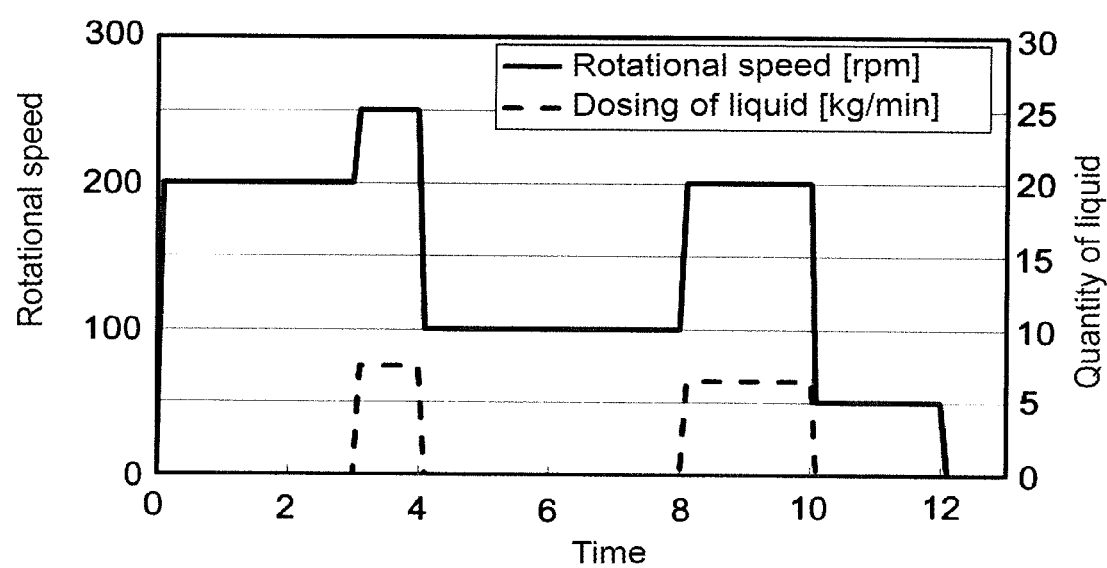

In FIG. 4, the dependence of the rotational speed in revolutions per minute (rpm) on the dosing of granulating liquid is represented in kilograms per minute (kg/min) for an exemplary, real granulation process according to the prior art plotted over time. After providing the powders required for the powder mixture, they are mixed together at a constant rotational speed of 200 rpm. After three minutes, granulating liquid is added to the powder mixture provided at a volume flow of 7.5 kg/min. Due to the dosing of granulating liquid, the required rotational speed for an optimal granulation process also increases to 250 rpm since a higher torque is needed for the mixed granulation of the now tougher and more viscous granulating mass. After four minutes, the dosing of the granulating liquid is stopped and the rotational speed drops to 100 rpm. Such idle phases during the granulation process are useful in the case of many granulation processes and their products since the granulating liquid generally requires some time to optimally integrate with the powder mixtures provided. Diffusion and swelling processes play an important role here. In addition, the required quantities of granulating liquids can be reduced due to the idle phases. After eight minutes, a volume flow of approx. 6.5 kg/min of granulating liquid is added to the granulating mass again, whereby the required rotational speed increases to 200 rpm. After ten minutes, the dosing of the granulating liquid is stopped, and the rotational speed again drops to 50 rpm before the granulation process ends after twelve minutes. With current technology, it is virtually impossible to drive processes with variable torque over the entire rotational speed range. As a result, the granulating mass is subjected to shear forces of different sizes during the granulation process which is not always practical.

Figure 5:
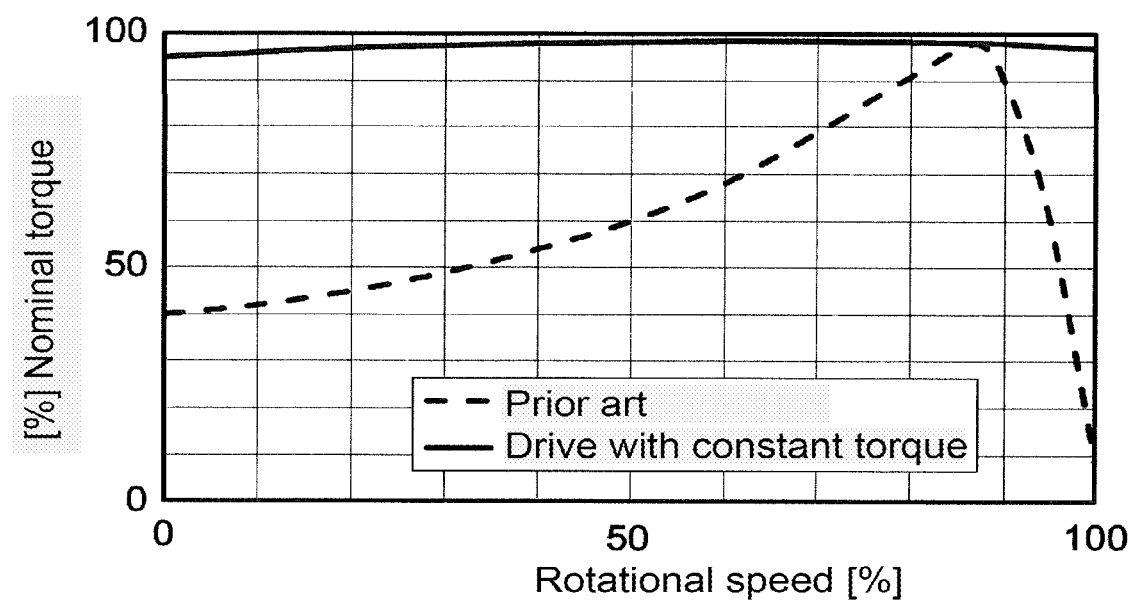

At the cutting edge of drive technology in granulating, in particular high shear granulating, are drive units 6 which generate the high required torques only at high rotational speeds. FIG. 5 shows for example the mentioned dependence of the torque on the rotational speed in the case of conventional drives for granulators (prior art; dashed curve), in particular high shear granulators. The shear forces occurring in the granulate production process are directly proportional to the rotational speed of the mixer 3, i.e. that the high mixer rotational speeds also lead to high shear forces. However, not all granulate production processes require these high rotational speeds because these granulation production processes even require no high shear forces for the granulate production process. It is therefore often even practical to granulate at slower speeds (low rotational speeds). In the case of conventional drives for granulators according to the prior art, owing to the low torque in the case of low rotational speeds at present thus in the case of slow speeds (low rotational speeds), there is a limitation in relation to the dosing of the granulating liquids since otherwise the drive forces are no longer sufficient in order to safely drive the mixer 3. If a high quantity of granulating liquid is required for the recipe, the granulating mass in the granulator will also be very tough and viscous and the drive forces are no longer sufficient for safely driving the mixer 3. In addition, it is also, at times, necessary in the case of standard granulating processes at high rotational speeds to stop the granulation process in order to for example carry out sample taking.

The granulation process must then be restarted which is not possible if the start-up torque is not sufficiently great for such purpose. Usually, the emptying process is carried out after the granulation process by way of a drain 9 for example a lateral opening or the like, in a screening machine. It is very important here not to overfill the screening machine. As a result, the emptying of the granulator must be carried out at very slow speeds and thus low rotational speeds. With conventional drive units from the prior art, as used for granulating at present, high torques cannot be practically generated in the case of low rotational speeds. According to the current prior art, the above-described problems can only be solved by a notable oversizing of the drive rod. This is, however, no longer appropriate in the context of energy efficiency and material usage. However, there is therefore virtually no possibility to influence the granulate properties, for example the granulate particle size or the like during an ongoing granulation process. FIG. 5 shows by way of example the dependence of the torque on the rotational speed in the case of drives with constant torque. These drives, for example hydraulic motors (water or oil or the like), servo or torque motors generate a constantly high torque virtually over the entire rotational speed range. Even in the case of low rotational speeds, the torque is very high in comparison to the drive units according to the prior art. In connection with suitable particle size measuring systems, completely new modes of operation of a granulation process are possible through the coupling of these drive units with a granulator, in particular with a high shear granulator. The drive units now offer the possibility during the granulation process of being able to vary the shear forces whereby there is the possibility of directly setting the granulate particle size since the shear forces in the process are directly proportional to the mixer rotational speed.

All features represented here may be essential to the invention both individually and also in any combination with one another.

LIST OF REFERENCE NUMERALS

1 granulator
2 working vessel
3 mixer
4 drive shaft
5 gear
6 drive unit
7 machine frame
8 chopper
9 drain
10 filter

The invention claimed is:

1. A device for granulating a powder to be granulated or a powder mixture to be granulated, comprising:
   at least one working vessel in which the powder to be granulated or the powder mixture to be granulated is provided,
   at least one mixer for mixing the powder to be granulated or the powder mixture to be granulated,
   at least one dosing device for granulating liquid, and
   at least one drive unit comprising a rotational speed range for providing a drive torque required for the mixer, wherein, the drive unit provides a uniformly high drive torque over its entire rotational speed range.

2. The device according to claim 1, wherein the drive unit is a hydraulic, servo and/or torque motor.

3. The device according to claim 1, wherein the device has a chopper.

4. The device according to claim 1, wherein the device is a high shear granulator.

5. The device according to claim 1, wherein the device has a particle size measuring system.

6. The device according to claim 1, wherein the device has at least one additional measuring system for temperature detection and/or for measuring moisture.

7. A method for granulating a powder to be granulated or a powder mixture to be granulated using a device, wherein the device comprises at least one working vessel in which the powder to be granulated or the powder mixture to be granulated is provided,
   at least one mixer for mixing the powder to be granulated or the powder mixture to be granulated, at least one dosing device for granulating liquid, and at least one drive unit comprising a rotational speed range for providing a drive torque required for the mixer, the method comprising:
   firstly mixing by the at least one mixer the powder to be granulated provided in the at least one working vessel or the powder mixture to be granulated provided in the at least one working vessel; and
   adding granulating liquid at the same time at least periodically,
   wherein shear forces can be varied by changing the rotational speed in the case of a torque which is constant or virtually constant over the entire rotational speed range in order to directly set the granulate properties.

8. The method according to claim 7, wherein a particle size measuring system monitors the granulate particle size during the granulation process.

9. The method according to claim 8, wherein the particle size measuring system controls and/or regulates the drive unit.

10. The method according to claim 8, wherein the particle size measuring system controls and/or regulates the dosing of the granulating liquid as a function of the granulate particle size.

11. The method according to claim 7, wherein the particles produced by the method are pellets.

* * * * *